United States Patent [19]
Vigansky, Jr.

[11] Patent Number: 5,765,544
[45] Date of Patent: Jun. 16, 1998

[54] FLOW-THROUGH HUMIDIFIER FOR MOBILE HOME FURNACE

[76] Inventor: Charles E. Vigansky, Jr., 7020 Base Line Rd., Grand Junction, Mich. 49056

[21] Appl. No.: 464,969

[22] Filed: Jun. 5, 1995

[51] Int. Cl.⁶ .................................................. F24F 3/14
[52] U.S. Cl. ................................ 126/113; 126/110 AA; 261/103; 261/106; 261/DIG. 15; 261/DIG. 41
[58] Field of Search .................... 126/113, 110 AA, 126/110 R, 99 R; 261/DIG. 41, 106, DIG. 15, 103

[56] References Cited

U.S. PATENT DOCUMENTS

| | | |
|---|---|---|
| 2,850,269 | 9/1958 | Bohanon . |
| 3,150,945 | 9/1964 | Baggeson . |
| 3,246,643 | 4/1966 | Stark et al. ............... 126/113 |
| 3,401,681 | 9/1968 | McDuffee, Sr. ............ 126/113 |
| 3,823,922 | 7/1974 | McElreath . |
| 3,898,976 | 8/1975 | Coffman, Jr. . |
| 3,902,473 | 9/1975 | Yeagle ....................... 126/113 |
| 3,902,474 | 9/1975 | Pyle . |
| 4,029,723 | 6/1977 | Morrison et al. . |
| 4,045,523 | 8/1977 | Goettl ....................... 261/106 |
| 4,101,609 | 7/1978 | Sumrow ................. 261/DIG. 41 |
| 4,125,576 | 11/1978 | Kozinski . |
| 4,211,735 | 7/1980 | Berlin . |
| 4,225,539 | 9/1980 | Grants . |
| 4,354,985 | 10/1982 | Johnson . |
| 5,140,667 | 8/1992 | Youngeberg . |
| 5,226,293 | 7/1993 | Brock . |

*Primary Examiner*—James C. Yeung
*Attorney, Agent, or Firm*—Price, Heneveld, Cooper, DeWitt & Litton

[57] ABSTRACT

A humidifier for use with counter- or down-flow furnaces such as those traditionally found in mobile homes. The humidifier includes a louvered tip-out access door, behind which is housed a drawer containing a water panel. The drawer is detachably snap-fitted to the inside of the access door. Water is directed onto the water panel by a water dispersion bar, which is snap-fitted into the top of the drawer above the water panel. As air is drawn through the humidifier which is installed over the return air louvers of a counter-flow furnace, tiny water droplets in the water panel are picked up by the moving air stream and carried into the home. The tip-out feature of the access door and the snap-fit connections allow for simple, easy repair and cleaning, even by an untrained person, thus avoiding the need for a skilled technician when only routine maintenance is necessary.

10 Claims, 3 Drawing Sheets

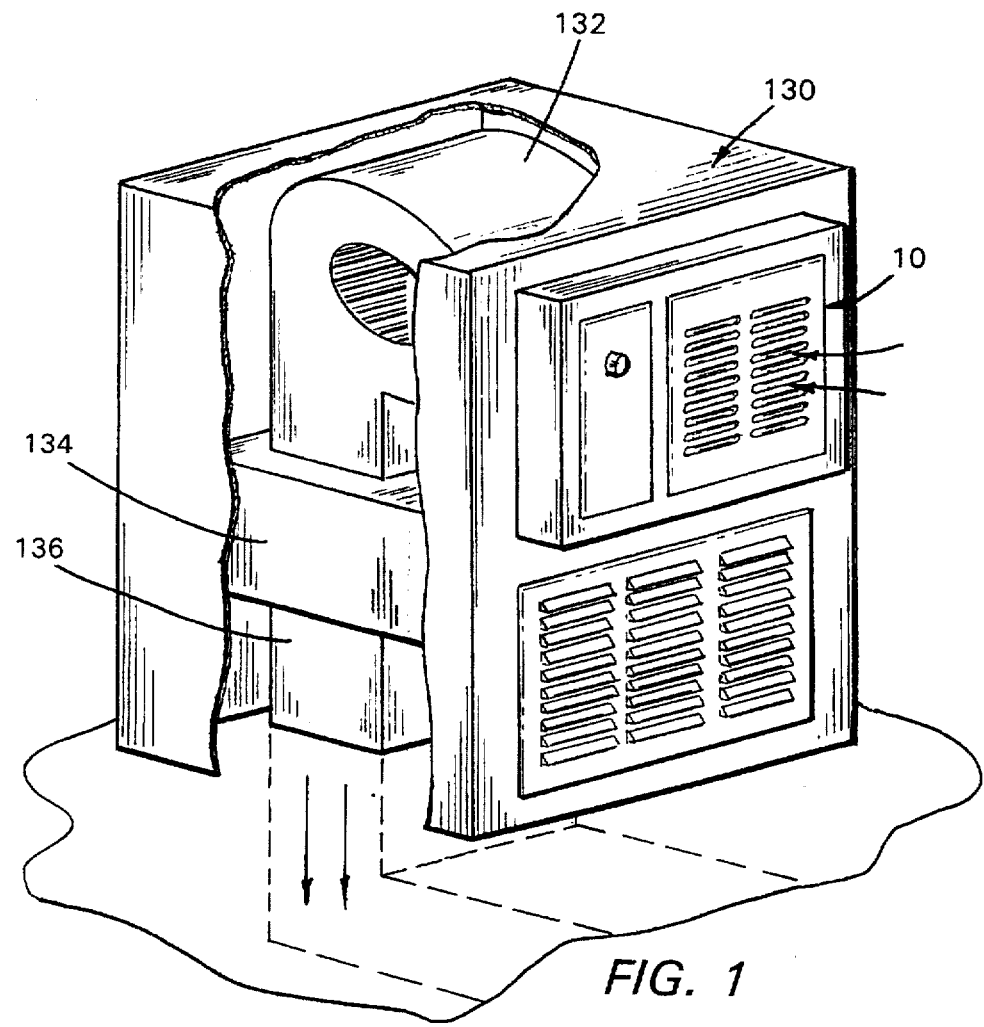
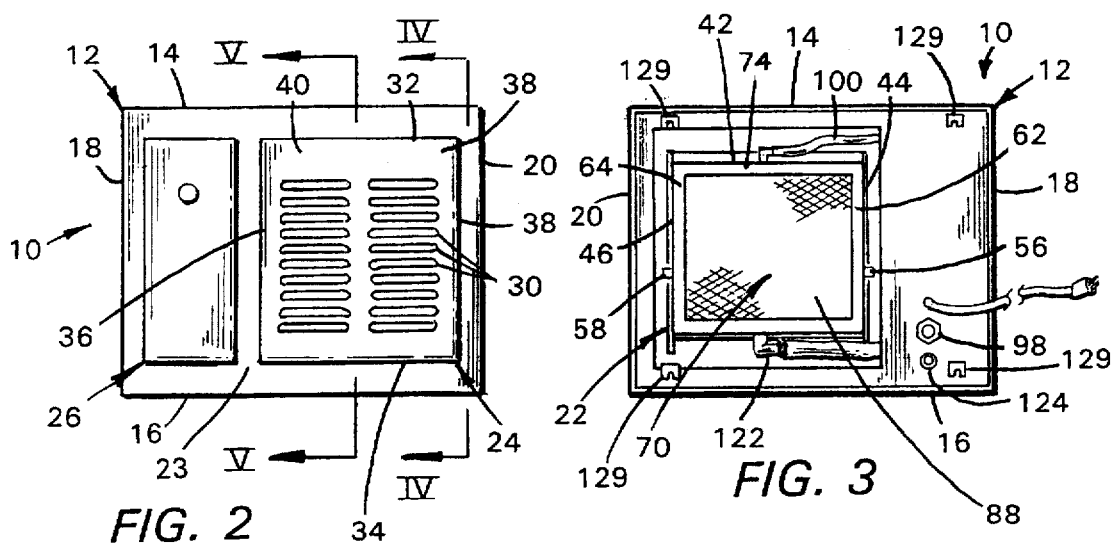

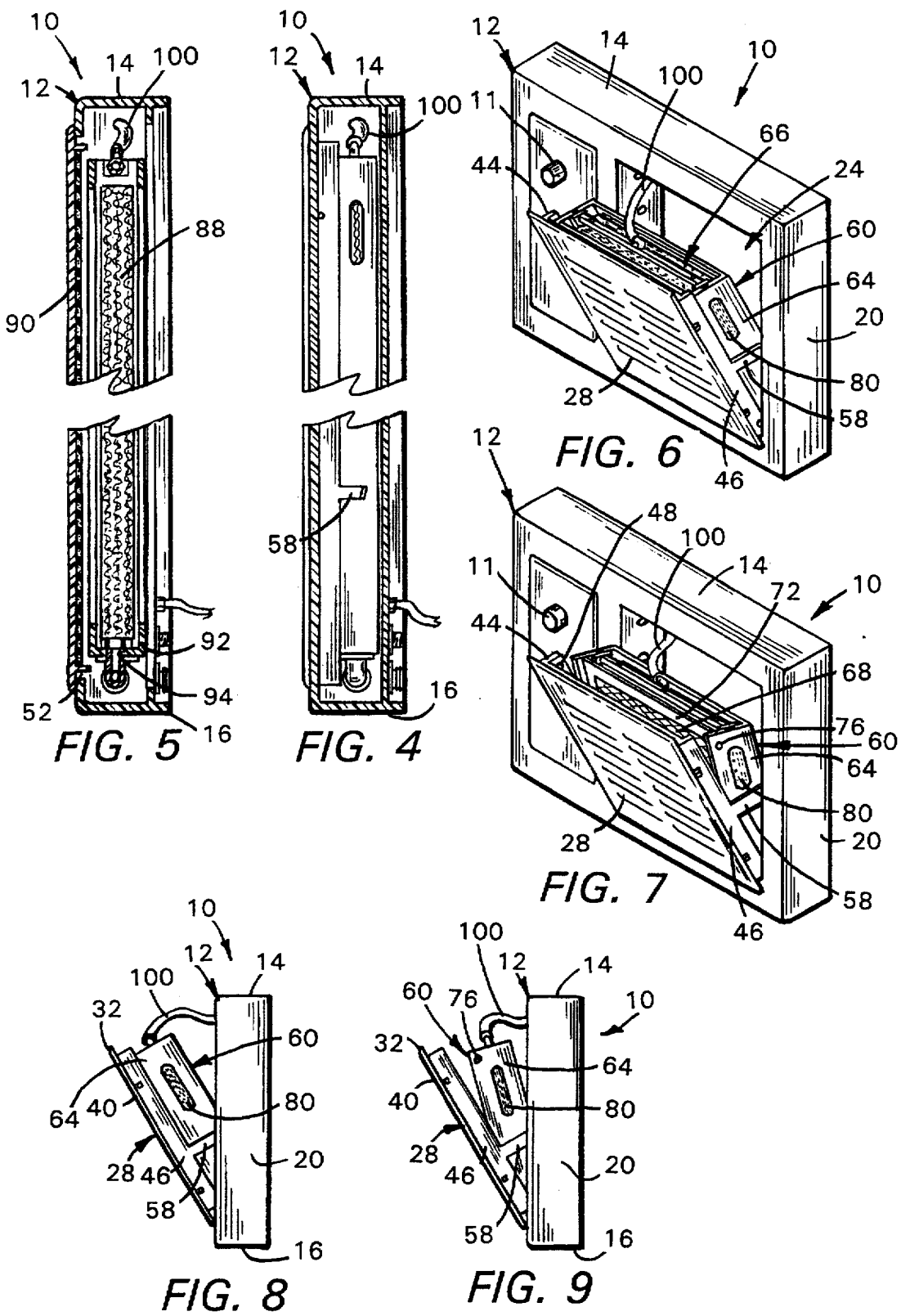

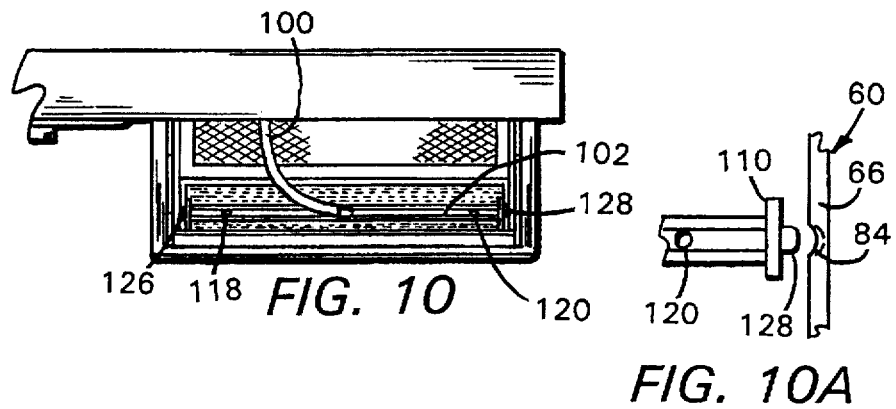
FIG. 10
FIG. 10A
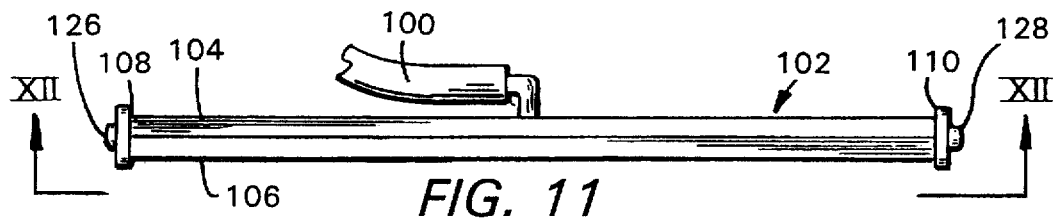
FIG. 11
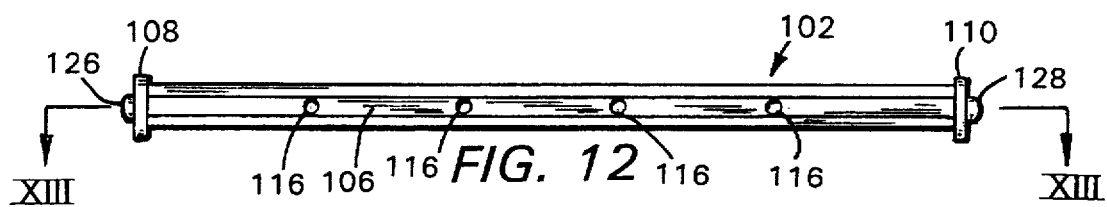
FIG. 12
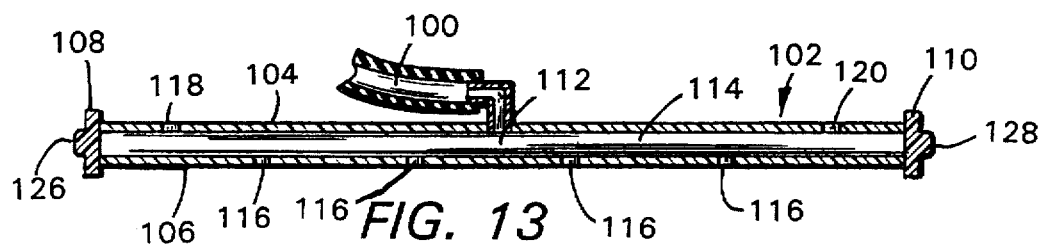
FIG. 13

5,765,544

1

FLOW-THROUGH HUMIDIFIER FOR MOBILE HOME FURNACE

BACKGROUND OF THE INVENTION

The present invention relates to a flow-through humidifier for use with a counter- or down-flow furnace, and particularly for the type of furnace traditionally found in a mobile home.

Various humidifiers have been provided for mounting on the underside wall or vertical wall of a warm air supply duct or cold air return of a forced air furnace. In the ordinary operation of a humidifier, such as that disclosed in U.S. Pat. No. 3,190,624, water is added to a tank. A water carrier is provided for lifting the water from the tank. The water is evaporated into an air stream by passing air through or near the carrier. Alternatively, water may be cascaded over a water panel with an air stream through the panel.

A humidifier which may be used in a home installation must be compact, that is, it must be able to add a suitable amount of water vapor to an air stream, but it must not take up much space. This is particularly true in a mobile home, where space is often limited, and where the furnace is usually quite visible, there being no basement or other separate room for housing the furnace. Furthermore, a mobile home furnace is typically a counter-flow furnace which lacks a return air duct. Return air is drawn through louvers on the face of the furnace housing.

A humidifier which is designed to be added to an existing system must be easy to install and be capable of being easily cleaned. Humidifiers customarily collect a substantial amount of minerals over time, so that in order to remove the minerals, the humidifier must be partially disassembled easily for cleaning. Additionally, any filter must be easily accessible for replacement. The humidifier must also be easily connected with utilities including water supply, electricity, and drain.

Therefore, a need exists for a compact humidifier which is easily installed and thereafter easily cleaned and maintained, and which is specifically adapted for use with a counter-flow furnace such as those typically found in mobile homes.

SUMMARY OF THE INVENTION

In the present invention, a humidifier is provided specifically for use with a counter-flow furnace such as those normally found in mobile homes. Such humidifier is combined with a counter-flow furnace in an air treatment system. The counter-flow furnace has an air intake passage and a panel covering the air intake passage. The humidifier is positioned on the panel at least partially over the air intake passage for adding water vapor to the air intake.

The humidifier preferably includes a housing adapted to be mounted to the furnace panel, in the air intake passage, over at least some of the louvers in the panel. A compartment is provided in the housing for receiving a water panel. Openings are defined in the housing juxtaposed with the compartment for transmitting room air across the compartment to the furnace panel louvers.

In a preferred embodiment, the humidifier includes a louvered access door, behind which is housed a drawer holding a water panel. Water is directed onto the water panel by a water dispersion bar, so that as air is drawn into the furnace through the humidifier, tiny water droplets will be picked up by the moving air stream to provide moisture to the warm air that heats the home. The access door pivots into

2 and out of the humidifier to allow for easy access to the inside of the humidifier when routine maintenance and cleaning is necessary.

In further aspects of the invention, the drawer is detachably snap-fitted to the inside of the access door, allowing for the optional placement of an air filter therein to collect particulate matter that may be in the moving air stream. The water dispersion bar is also snap-fitted into the drawer above the water panel, to allow easy access to the water panel for replacement and/or to clean the water dispersion openings on the bottom of the water dispersion bar. These features obviate the need to rely on a trained technician, as such simple cleaning and maintenance procedures can be performed even by an unskilled person. The humidifier is also compact, which is desirable in mobile homes where space is often limited. A humidifier according to the invention is easy to install, and is similarly easy to maintain and clean. The humidifier is also compact and attractive, so as to be relatively unnoticeable when installed on a counter-flow furnace.

These and other features, advantages and objects of the present invention will be further understood and appreciated by those skilled in the art by reference to the following specification, claims and appended drawings.

BRIEF DESCRIPTION OF THE DRAWINGS

FIG. 1 is a perspective view showing a humidifier embodying the present invention mounted over the top set of louvers in the air intake path of a counter-flow furnace;

FIG. 2 is a front elevation of the humidifier in FIG. 1;

FIG. 3 is a rear elevation of the humidifier in FIG. 1;

FIG. 4 is a sectional view taken along the line IV—IV of FIG. 2;

FIG. 5 is a sectional view taken along the line V—V of FIG. 2;

FIG. 6 is a front top perspective view of the humidifier in FIG. 1, showing the louvered access door in the open position;

FIG. 7 is a front top perspective view of the humidifier in FIG. 1, showing the louvered access door in the open position and the drawer holding the water panel unsnapped from the access door;

FIG. 8 is a side elevation of the humidifier, showing the louvered access door in the open position;

FIG. 9 is a side elevation of the humidifier, showing the louvered access door in the open position and the drawer holding the water panel unsnapped from the access door;

FIG. 10 is a top view of the humidifier, showing the louvered access door in the open position;

FIG. 10A is an enlarged view showing the interconnecting relationship between the water dispersion bar and the drawer;

FIG. 11 is a side elevation of the water dispersion bar for use in the present invention;

FIG. 12 is a bottom view of the water dispersion bar; and

FIG. 13 is a cross-sectional view taken along the line XIII—XIII of FIG. 12.

DETAILED DESCRIPTION OF PREFERRED EMBODIMENT

Referring now specifically to the drawings and the illustrative embodiments depicted therein, a humidifier 10 for use with a counter- or down-flow furnace, such as the type typically found in mobile homes and the like includes a frame or housing 12 (FIGS. 1–10).

Frame 12 is preferably rectangular in shape, and has a top 14, a bottom 16, and sides 18, 20. In the preferred embodiment, humidifier 10 has a depth of approximately three inches. This allows humidifier 10 to be installed on an existing furnace without taking up much space and provides for a humidifier that is more attractive and less cumbersome to work with and to maneuver around. As shown in FIG. 3, the back or rear surface 22 of humidifier 10 is open, i.e., unenclosed, and is adapted to be mounted to a furnace. Front 23 has two rectangular openings 24, 26.

Disposed within rectangular opening 24 is access door 28. Access door 28 is provided with a plurality of louvers 30, to allow for the passage of air from the room through humidifier 10 and into the furnace 130. Access door 28 has a top edge 32, a bottom edge 34, and side edges 36, 38. Access door 28 also has an outer face 40, which faces away from humidifier 10 and toward the room when installed, and an inner face 42, which faces into humidifier 10 and toward furnace 130 when installed.

Access door 28 is further provided with ribs 44, 46, as shown in FIGS. 6–9. Ribs 44, 46 are attached to inner face 42 of access door 28, and extend perpendicularly therefrom. One rib 44, 46 is positioned near each side edge 36, 38 of access door 28, and extends from near top edge 32 to near bottom edge 34. Near the top of each rib 44, 46 is an inwardly projecting nub 48. As discussed more fully below, nubs 48 allow for easy disassembly of humidifier 10 and its various components.

At the base of each rib 44, 46 is a notch 52. When assembled, access door 28 is positioned within frame 12 so that notches 52 rest on the bottom of rectangular opening 24. Notches 52 allow access door 28 to be pivoted in and out of rectangular opening 24. During normal operation, access door 28 will be in the closed position, i.e., inner face 42 of access door 28 will be in contact with front 23 of frame 12. When maintenance and/or cleaning of humidifier 10 is necessary or desired, this tip-out feature allows for quick and easy access to the inner parts of humidifier 10, even by someone who is not an expert in the field of humidifiers, thereby avoiding the necessity of hiring a trained technician to perform these types of routine activities. This access can be accomplished by simply inserting a narrow object, such as a screw driver, between access door 28 and frame 12 and gently wedging or prying open access door 28. Notches 52 act as a pivot at the bottom of rectangular opening 24, causing top edge 32 of access door 28 to tip out away from frame 12. Each rib 46, 48 is further provided with projections 56, 58, as shown in FIGS. 8 and 9, which are configured so as to contact frame 12 when access door 28 is in the open position and prevent access door 28 from tipping completely out of frame 12.

Humidifier 10 also includes a drawer or compartment 60. Drawer 60 has sides 62, 64, an open top 66, an open front 68 facing toward access door 28, and an open back 70. A bar 72 extends from one side 62 to the other side 64 at front 68 and along top 66 of drawer 60. Similarly, a bar 74 extends from one side 62 to the other side 64 at back 70 and along top 66 of drawer 60. This configuration allows drawer 60 to securely house water panel 88.

Water panel 88 can be any of the type well known in the art, and is generally constructed in a honeycomb-like structure. Suitable water panels for use in the present invention are made by Research Products of Madison, Wis. Water panel 88 is inserted into the open top 66 of drawer 60 so that water panel 88 occupies the open front 68 and back 70 of drawer 60. As discussed more fully below, the open nature of drawer 60 allows air to be drawn in through louvers 30 of access door 28 and then through water panel 88. Water is trickled downwardly through the nooks and crannies of water panel 88, creating tiny water droplets which are picked up by the moving current of air and passed into the furnace.

Each side 62, 64 of drawer 60 has an outwardly facing groove 76 near the top 66 of drawer 60. Grooves 76 are positioned so as to align with inwardly projecting nubs 48 on ribs 44, 46 of access door 28. Ribs 44, 46 are positioned from one another at a distance which is slightly larger than the width of drawer 60. This allows drawer 60 to be positioned within ribs 44, 46 and against inner face 42 of access door 28. Nubs 48 and grooves 76 allow drawer 60 to be snapped into and out of contact with access door 28. This allows for even greater access to the various parts for cleaning and maintenance. Also, this snap-in feature allows for the optional placement of a thin filter 90 between inner face 42 of access door 28 and drawer 60 having water panel 88 therein, to filter out any particulate matter that may be in the moving air stream.

Each side 62, 64 of drawer 60 is further provided with elongated slot 80 as shown in FIGS. 8 and 9, which extends generally in a direction from top 66 to bottom 67 of drawer 60. These slots 80 allow for the easy removal by hand of water panel 88, simply by inserting a finger in each slot 80 and urging water panel 88 up through open top 66 of drawer 60. This further facilitates the quick and easy replacement of a worn-out or dirty water panel 88, without the need for a skilled repairman.

At the bottom of drawer 60 is drainage tray 92. Drainage tray 92 is preferably tapered downwardly and inwardly to drainage opening 94. This will cause water that has trickled through water panel 88 and not been picked up by the moving air stream to collect in drainage tray 92 and run toward drainage opening 94. Water panel 88 may rest directly on drainage tray 92 or drainage tray 92 may optionally be provided with one or more offsets which serve to elevate water panel 88 slightly, thereby enhancing water flow to drainage opening 94.

In order for humidifier 10 to perform its purpose, water must be provided to humidifier 10. Therefore, it is desirable to have a source of water located near furnace 130 and humidifier 10. Water inlet 98 is provided on the back of humidifier 10. Inlet 98 is a standard size fitting, so as to allow for standard tubing to run from the water source to inlet 98. Water line 100 runs from inlet 98 to a position above water panel 88, where water line 100 is attached to water dispersion bar 102.

As shown in FIGS. 11–13, water dispersion bar 102 is an elongated stick or rod having a top 104, a bottom 106, and ends 108, 110. Bar 102 has an inlet opening 112 along top 104, in which water from water line 100 flows into channel 114, running along the length of the inside of bar 102. A plurality of dispersion openings 116 extend from channel 114 to bottom 106 of bar 102, for dispersing and directing narrow streams of water onto water panel 88. In order to assure that the water entering through inlet opening 112 and into channel 114 reaches the dispersion openings 116 closest to ends 108, 110 of bar 102, vent openings 118, 120 are provided in top 104 of bar 102 close to ends 108, 110. Vent openings 118, 120 and dispersion openings 116 are easily cleaned by inserting an item such as a toothpick for example, to remove any debris or minerals that may be impeding the flow of water. Drainage line 122 is connected at one end to drainage opening 94 and runs to water outlet 124, to remove any water that passes through water panel 88 without being drawn into the moving air stream. Drainage line 122 and water line 100 may be of any suitable material, such as ¼ inch plastic tubing. Once the water reaches water outlet 124, it must be disposed of, for example, by running a line from the outlet 124 to a suitable disposal area, such as a nearby sink or drain.

Water dispersion bar 102 is further provided with a rounded projection 126, 128 on each end 108, 110 of bar 102. This allows for snap-fit attachment of water bar 102 into top 66 of drawer 60, which is provided with inwardly facing recesses 84 as shown in FIG. 10A. Bar 102 is placed over water panel 88 with dispersion openings 116 facing water panel 88, and rounded projections 126, 128 are aligned with recesses 84 in top 66 of drawer 60. Bar 102 is then gently pushed downwardly until it snaps into place, i.e., projections 126, 128, contact and fit within recesses 84. This snap-fit connection allows bar 102 to be easily removed from drawer 60, such as when it is necessary to remove water panel 88 for repair or replacement, or when it is necessary to clean dispersion openings 116 of bar 102.

The flow of water to water line 100 is controlled by a conventional solenoid valve (not shown). The solenoid valve may be connected with the blower circuit of the furnace so as to open when the furnace blower is on and close when the blower is off. A humidistat (not shown) may be connected in series with the solenoid valve to provide automatic control of relative humidity in the humidified air space. A control knob 11 is provided to allow one to set the humidistat at the desired level. A transformer (not shown) is electrically coupled between the humidistat and the solenoid coil via wires and the high voltage side of the transformer is coupled through wires with a 110-volt power source. A conventional furnace burner and blower control means is coupled in the power line and the blower motor is electrically coupled across the lines.

In the preferred embodiment, humidifier 10 is installed over the return air louvers of a counter-flow furnace system 130, as shown in FIG. 1. Humidifier 10 is preferably mounted over the upper set of louvers, so as to be in line with blower 132. Humidifier 10 is provided with mounting brackets 129 on the back 22. A hole is made in the furnace louvers for insertion of the power cord and the water and drainage lines. Metal screws or nuts and bolts are inserted into the furnace at appropriate locations to allow humidifier 10 to be mounted over the louvers by resting mounting brackets 129 on the screws or bolts.

In the normal operation of a counter- or down-flow furnace, blower 132 draws air from the room through the inlet louvers on the furnace. This air is then blown downwardly through a burner or heat exchanger 134, where it is heated, and then passed further downwardly through the warm air exit 136. In the typical mobile home layout, the duct work runs along the bottom of the mobile home, and the warm air pushed down through exit 136 and into the duct work reaches the various rooms in the home through air ducts in the floor.

To summarize the installation and use of the entire assembly, screws are placed around the top set of louvers of a counter-flow furnace, and a hole is drilled through the louvers as well. The power cord of humidifier 10 is inserted through this hole and coupled with the blower motor. One line is connected between a water source and the water inlet 98 on the back 22 of humidifier 10, and another line is attached to the water outlet 124 on the back 22 of humidifier 10 and led to a drainage area. Each of these lines is inserted through the drilled hole in the furnace. Humidifier 10 is then mounted over the furnace louvers by resting mounting brackets 129 on the screws in the furnace louvers. The humidistat is set at the desired level of humidity by adjusting control knob 11. Because of the coupling between the power cord and the blower motor, when the blower is activated humidifier 10 will also be activated. The solenoid valve opens and lets in water, which travels through water line 100 and into water dispersion bar 102 through inlet opening 112. The water travels through channel 114 and out dispersion openings 116, which direct the water streams on to water panel 88. As the water trickles down through water panel 88, a stream of air is being drawn through the louvers 30 of humidifier 10 and into furnace 130. This air stream will pick up tiny droplets of water as it passes through water panel 88, which will eventually be carried through the blower 132, the burner 134, and to the duct work of the home, so that the air that finally reaches the rooms of the home contains the desired level of moisture. Water that is not captured by the moving air stream filters down through water panel 88, on to drainage tray 92, out drainage opening 94, and through drainage line 122, where it exits humidifier 10 at water outlet 124. From there the water is carried to a suitable drainage area, such as a nearby sink or drain.

Cleaning and maintaining of humidifier 10 is easily accomplished. Access door 28 may be pried open by the insertion of, e.g., a screwdriver, and notches 52 in the bottom of ribs 44, 46 allow the top 32 of access door 28 to pivot outwardly to provide access to the interior of humidifier 10. Projections 56, 58 on ribs 44, 46 keep access door 28 from tipping completely out of humidifier 10. Access to air filter 90 positioned between inner face 42 of access door 28 and drawer 60 is accomplished by unsnapping drawer 60 from ribs 44, 46. This snap-fit is accomplished by means of inwardly projecting nubs 48 near the top of ribs 44, 46, which align and fit with outwardly projecting grooves 76 in drawer 60. Cleaning and maintaining of water dispersion bar 102 is also accomplished by a snap-fit connection by aligning rounded projections 126, 128 on bar 102 with recesses 84 in top 66 of drawer 60. Vent openings 118 and dispersion openings 116 may be cleaned by the insertion of an object such as a toothpick. With the bar 102 unsnapped, water panel 88 may also be replaced. Removal of water panel 88 is easily accomplished by means of slots 80 in the sides 62, 64 of drawer 60, which allow water panel 88 to be slid out through top 66 of drawer 60.

The humidifier 10 of the preferred embodiment is thus easy to install and service even by inexperienced persons. Humidifier 10, being designed specifically for use with counter-flow furnaces such as those traditionally found in mobile homes, is compact and attractive.

The above description is considered that of the preferred embodiments only. Modifications of the invention will occur to those skilled in the art and to those who make or use the invention. Therefore, it is understood that the embodiments shown in the drawings and described above are merely for illustrative purposes and are not intended to limit the scope of the invention, which is defined by the following claims as interpreted according to the principles of patent law, including the Doctrine of Equivalents.

The embodiments of the invention in which an exclusive property or privilege is claimed are defined as follows:

1. A humidifier for use with a counter-flow furnace comprising:

a frame;

an access door disposed within said frame;

a drawer removably attached to said access door, said drawer having sides;

a water panel disposed within said drawer; and a water dispersion bar attached to said drawer for dispersing water onto said water panel.

2. The humidifier of claim 1, wherein said access door is provided with a plurality of louvers.

3. The humidifier of claim 2, wherein said access door is provided with two ribs extending substantially perpendicularly from said access door and into said humidifier, said ribs being spaced at a distance sufficient to house said drawer therein.

4. The humidifier of claim 3, wherein each rib is provided with a notch which allows said access door to be pivoted into and out of said frame of said humidifier.

5. The humidifier of claim 4, wherein each rib is further provided with a projection configured to contact said frame when said access door is pivoted away from said humidifier and impede said access door from tipping completely out of said frame.

6. The humidifier of claim 5, wherein each rib is provided with an inwardly facing nub, and said drawer is provided with outwardly facing grooves which align with and contact said nubs, providing a snap-fit connection between said drawer and said access door for detaching said drawer from said access door.

7. The humidifier of claim 6, wherein an air filter is positioned between said access door and said drawer.

8. The humidifier of claim 7, wherein each side of said drawer is provided with a slot to allow for removal of said water panel.

9. The humidifier of claim 8, further comprising a drainage tray attached to said drawer for collecting water that passes through said water panel.

10. The humidifier of claim 9, wherein said drainage tray is tapered downwardly and inwardly toward a drainage opening centrally positioned in said drainage tray, said drainage tray being further provided with one or more offsets for elevating said water panel above said drainage tray to enhance drainage.

* * * * *